United States Patent Office  3,449,307
Patented June 10, 1969

3,449,307
THERMOPLASTIC RESINS FROM
ARYL OLEFINS
Gene Nowlin, Glen Burnie, Md., and Harold D. Lyons, Bartlesville, Okla., assignors to Phillips Petroleum Company, a corporation of Delaware
No Drawing. Filed June 5, 1956, Ser. No. 589,376
Int. Cl. C07f 1/42, 7/04, 19/04
U.S. Cl. 260—84.1          12 Claims

ABSTRACT OF THE DISCLOSURE

Copolymers of styrene with at least one monoolefin and multiolefin and homopolymers of styrene are prepared by contacting the monomers with a catalyst formed by admixing a trialkyl aluminum and titanium tetrachloride in a mole ratio of from 2 to 5:1 respectively, at temperatures of from 75 to 100° C. in a hydrocarbon diluent present in an amount of from 0.5 to 20 volumes of diluent per volume of monomer.

---

This invention relates to the polymerization of styrene and derivatives thereof. In one aspect this invention relates to an improved method for polymerizing such aryl olefins in the presence of a novel catalyst system.

Reactions for polymerizing styrene are well known. However, polymers formed in the presence of many of these prior art catalysts are low melting having a melting point below 200° C. and therefore are unsuitable for preparing articles for high temperature uses.

It is an object of this invention, therefore, to provide a method for preparing polymers of styrene and certain derivatives thereof having high melting temperatures.

It is a further object of this invention to provide a method for polymerizing styrene and certain derivatives thereof in the presence of a novel catalyst system.

We have discovered that a polymer with an unexpectedly high melting point is obtained when monomers comprising at least 80 weight percent styrene, alpha-methylstyrene or alkyl, alkoxy or halogen ring substituted styrene or alpha-methylstyrene is polymerized in the presence of a catalyst comprising an organo-metal and a chloride such as a di-, tri- or tetrachloride, of a Group IV-B metal of the long periodic table. A ratio of 2 to 5 mols of organo-metal per mol of chloride of the Group IV-B metal is employed. The polymerization process of this invention can be carried out as a batch or a continuous process with excellent yields of unexpectedly high melting point polymers. The styrene or its derivative can be polymerized or copolymerized at other mol ratios of organo-metal to chloride of the metal, however, to obtain these high melting point polymers, the mol ratios indicated are used. Such polymers will have a melting point in excess of 220° C. This melting point is determined by placing a portion of the polymer in a test tube and heating until the polymer is completely in the liquid phase.

The monomeric materials which can be polymerized in accordance with this invention are styrene and derivatives thereof such as styrene with non-interfering substituents in the ring such as alkyl, alkoxy, and halogen as well as alpha-methylstyrene and similar derivatives. In general the total carbon atoms in such substituents should not exceed 12 and such substituents generally are methyl, ethyl, methoxy and ethoxy or halogen, e.g. styrene, 3-methylstyrene, 2,3-dimethylstyrene, 2,4,6-trimethylstyrene, 3-ethylstyrene, 4-ethylstyrene, 3,5-diethylstyrene, 4-dodecylstyrene, 3-decylstyrene, 3-octylstyrene, 2-butyl-3-hexyl-styrene, 2-butyl-4-propylstyrene, 3-decoxystyrene, 2-butoxystyrene, 2-methoxystyrene, 3-ethoxystyrene, 1,3,5-trichlorostyrene, 2,5-dibromostyrene, 3-chlorostyrene, 2-(1-chlorobutyl)styrene and the like.

As has been indicated, the styrene or substituted styrene comprises at least 80 weight percent of the monomers. Monomers copolymerizable with the styrene can be any monoolefin or multiolefin, conjugated or non-conjugated. Copolymerizable monomers include ethylene, propylene, 1-butene, 1-hexene, 1-octene, butadiene, isoprene, piperylene, 2-methylpentadiene, 2,3-dimethyl-1,3-butadiene, 1,5-hexadiene, 1,4-pentadiene, liquid polybutadiene and the like.

The preferred catalyst comprises a trialkylaluminum and a titanium tetrachloride since such catalyst readily promotes polymerization yielding the high melting point polymers. However, the polymerization process to which our invention pertains is operable using as one component of the catalyst a hydride or organo compound of the metals aluminum, gallium, indium, beryllium and thallium. The general formula for such catalyst component is $MR_n$ where M is one of the foregoing metals and R is hydrogen, an alkyl radical, a cycloalkyl radical, an aryl radical or any combination thereof and wherein $n$ is the valence of the metal, i.e. 2 or 3. Examples of these catalysts which can be used are $Al(C_2H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_2$,

$$Al(CH_2-(CH_2)_{18}-CH_3)_3$$

$Ga(C_6H_5)_3$, $In(C_6H_5)_3$ and the like. These polymerization catalysts can also be used in the form of their known and stable organic complexes such as complexes with alkali metal hydrides, alkali metal alkyls and alkali metal aryls. Examples of such complex compounds which can be used as the catalyst are $LiAlH_4$, $NaAl(CH_3)_4$, $NaBe(C_6H_5)_3$, $NaBe(C_2H_5)_3$ and the like.

As has been indicated, the di-, tri-, and tetrachlorides of a Group IV-B metal are employed as a component of the catalyst systems of this invention. The chlorides of any or all of the Group IV-B metals can be used. The meals of Group IV-B of the long periodic table are titanium, thorium, zirconium, and hafnium, and when Group IV-B metal is used in this specification and the claims such metals are intended. The chlorides of titanium are the most preferred, and the tetrachloride of titanium is especially useful since it is liquid at normal temperature and has a high activity for the polymerization reaction. Also the tetrachlorides of zirconium are liquids at atmospheric conditions and are preferred for this reason and because they have a high activity in the process of this invention. Those chlorides of Group IV-B metals which are solids under normal conditions are useful in the process of this invention, particularly when they are used in conjunction with an organic liquid solvent in which the solid catalyst component is at least partially soluble. The amount of the Group IV-B metal chloride used in accordance with this invention is in the range from 2 to 5 mols organo-metal compound per mol of the Group IV-B metal halide.

While the process of this invention may be carried out over a very broad temperature range, it is preferred to operate at temperatures in the range wherein the solvent or diluent refluxes at atmospheric pressure, however higher temperatures say up to 500° C. or even higher, are operable wherein pressure is used; however, the preferred operating range is 75 to 100° C. The pressure at which the reaction is carried out can be in the range from atmospheric up to 20,000 or 30,000 p.s.i.g. or even higher. In this connection, it is preferred to carry out the reaction in the presence of an inert, organic hydrocarbon diluent and under a pressure sufficient to maintain the reaction mixture substantially in liquid state. The amount of diluent generally employed is in the range of 0.5 to 20 volumes diluent per volume of monomer. The preferred pressure used is in the range from atmospheric to 1500 p.s.i.g. since high melting point polymers have been found to be produced in excellent yields when operating in this range.

Suitable diluents are paraffins, cycloparaffins and/or aromatic hydrocarbons which are relatively inert, non-deleterious and liquid under the reaction conditions of the process. Diluents which can readily be used are the higher molecular weight paraffins and cycloparaffins such as isooctane, cyclohexane, methylcyclohexane and aromatic diluents such as benzene, toluene, and the like; however, lower molecular weight paraffins such as propane, butane and pentane can be used especially when the process is carried out at low temperatures and/or high pressures.

We have found benzene and cyclohexane to be especially effective especially when operating under refluxing conditions at atmospheric pressure and these two solvents are preferred.

The process of this invention can be carried out as a batch process by adding the monomers to a reactor containing catalyst components and diluent, or the process can be carried out continuously by maintaining the above-mentioned concentrations of reactants in the reactor for a suitable residence time. The residence time used in a continuous process can vary widely since it will depend upon the temperature at which the process is carried out to a great extent. The residence time will also vary depending upon the specific olefin that is polymerized. However, the residence time for the polymerization of monomers within the preferred temperature range of 75 to 100° C. falls within the range of one second to an hour or more. In a batch process, the time for the reaction can vary widely, also, such as up to 24 hours or more.

Various materials are known to be poisons for the organo-metal catalyst used in the polymerization process of this invention. These materials include carbon dioxide, oxygen and water. It is highly desirable, therefore, that the olefin stream is freed of these materials as well as other materials which tend to inactivate these organo-metal catalysts. Any of the known means for removing such contaminants can be used. Also, when a diluent is employed in the process, this material should be freed of impurities such as water, oxygen and the like. In this connection, it is desirable to remove air and moisture from the reaction vessel in which the process is carried out.

At the completion of the polymerization reaction, the organo-metal catalyst is killed or inactivated in any suitable manner and the polymer is separated from the diluent, if such were used, washed with an alcohol and dried. When the process of the invention is carried out continuously, the polymer, diluent and catalyst system are pumped out of the reactor, and the catalyst is killed as by treatment with alcohol. The polymer is precipitated and then separated from the diluent. The solid polymer can be washed and dried, or treated in any other desired manner.

The following examples are supplied to illustrate the improved process and polymer which is obtained in accordance with this invention and should not be used to unduly restrict the scope of the invention as set forth in the foregoing description. In each of the examples which follow, the polymer was recovered from the reaction mixture by the same general procedure. The catalyst was inactivated, initially, by treating the total effluent from the reactor with low molecular weight alcohol, such as methyl, ethyl, isopropyl alcohols and the like using a quantity of the alcohol which was in excess of that theoretically required to react with the amount of the organo-metal catalyst charged to the reactor. After thoroughly mixing the alcohol with the reactor effluent, the solid polymer was separated from the liquid by decantation or filtration. A slurry of the solid polymer was then prepared in a normal alcohol in a Waring Blendor, using from 5 to 7 parts by weight of said alcohol per part by weight of the polymer. The resulting finely divided polymer was then separated from the isopropyl alcohol by filtration and, finally, dried in a vacuum oven for several hours at about 165° F.

In the following examples the melting point is that point wherein the polymer is all liquid. Those skilled in the art will understand that these polymers first soften and finally melt.

EXAMPLE I

A catalyst suspension was prepared by mixing 10 grams of titanium tetrachloride and 20 grams of triethylaluminum containing 0.5 weight percent chlorine with benzene (distilled from sodium) to give 100 cc. of suspension.

A reactor at atmospheric pressure provided with a stirrer, water condenser, thermocouple well, inlet for purified nitrogen, and a dropping funnel was purged with nitrogen. Ten cc. of the catalyst suspension, prepared as described above, together with 300 cc. of benzene (distilled from sodium) was charged to the reactor, and then 60.5 grams of freshly distilled styrene was introduced through the dropping funnel. The styrene was introduced rapidly, with stirring, and there was no apparent heat of reaction. Another 10 cc. portion of the catalyst suspension was added and the mixture was stirred and heated until refluxing occurred. After the first hour the mixture had become viscous and some solid polymer had separated. Stirring and heating were continued for a total of 6 hours. Nitrogen was kept flowing through the system at a slow rate to maintain an inert atmosphere in the reactor. The reactor contents were poured, with stirring, into 1000 cc. of methanol. The solvent was decanted from the solid polymer and the polymer treated twice in a Waring Blendor with 500 cc. portions of methanol. The solvent was removed and a white finely-divided polymer was obtained after being dried overnight in a vacuum oven at 60° C. The yield was 20.2 grams or a 32 weight percent yield based on the styrene charged. The polymer had a melting point of 231° C., Shore D hardness of 84–86, density of 1.074, low flexibility, and was insoluble in benzene.

EXAMPLE II

The general procedure employed in the foregoing run was followed. Reactor charge: 200 cc. benzene (distilled from sodium); 1 gram titanium tetrachloride; 2 grams triethylaluminum containing 0.5 weight percent chlorine; a mixture of 90.7 grams freshly distilled styrene and 6.7 grams of 1-hexene distilled from sodium. There was no apparent evolution of heat when the monomer mixture was added to the catalyst suspension. The mixture was stirred and refluxed 10 hours and became very viscous. The catalyst was inactivated and the polymer precipitated and washed as in the preceding examples. A white to slightly cream colored crystalline product (21.1 grams; 22 percent yield) was obtained after the product was dried in a vacuum oven overnight at 80° C. It had a melting point of 238° C., a density of 1.045, inherent viscosity of 2,207, and impact strength (falling ball method) of 6 inches. The flexibility was low. It was molded into a disk which was slightly gray.

EXAMPLE III

The general procedure employed in the foregoing runs was followed in this example. Reactor change: 100 cc. cyclohexane; 1.7 grams titanium tetrachloride; 6 grams of tri-isobutylaluminum; and the mixture heated to 80° C. under refluxing conditions; 47 grams (52 cc.) of styrene added dropwise over a period of 16 minutes while maintaining the temperature of 80° C. After the styrene was added, the mixture was cooled to room temperature and 100 cc. of methyl alcohol was added to coagulate the polymer. The precipitated polymer was washed with additional methyl alcohol and dried. The yield was 19 grams of polymer, 40.5 percent, and the product had a melting point in excess of 265° C.

EXAMPLE IV

One run was made wherein the mol ratio of organo-metal to metal halide was 1.2 mols organo-metal to 1 mol metal halide. The melting point was low.

The general procedure employed in the foregoing runs was followed. Reactor charge: 250 cc. xylene (distilled from sodium); 0.5 gram titanium tetrachloride; 0.75 gram triethylaluminum containing 0.5 weight percent chlorine; 90.7 grams of freshly distilled styrene. The mixture was stirred and refluxed and became amber after 15 minutes. After 4 hours 0.5 gram more of titanium tetrachloride was added. Stirring and refluxing were continued for 20 hours. 6 cc. of methanol was added, the mixture was filtered hot to remove inorganic materials, and the filtrate was poured into 2000 cc. methanol to precipitate the polymer which separated in a taffy-like form. It was washed with methanol in a Waring Blender, filtered, and dried overnight in a vacuum oven at 80° C. A white powder which weighed 75.2 grams (83 percent yield) was obtained which had a melting point of 95° C.

We claim:

1. A process for preparing copolymers of styrene having a melting point in excess of 220° C., which comprises copolymerizing a monomer mixture containing at least 80 weight percent styrene and the remainder being at least one aliphatic monoolefin or multiolefin by contacting said mixture in a hydrocarbon diluent with a catalyst at a temperature of from 75 to 100° C., said catalyst formed by admixing (a) a trialkyl aluminum compound with (b) titanium tetrachloride in a mole ratio of trialkyl aluminum to titanium tetrachloride within the range of 2 to 5, and said diluent being present in an amount of from 0.5 to 20 volumes per volume of said monomer mixture.

2. A process according to claim 1 wherein said monoolefin or multiolefin is ethylene, propylene, 1-butene, 1-hexene, 1 - octene, butadiene, isoprene, piperylene, 2-methylpentadiene, 2,3-dimethyl-1,3-butadiene, 1,5-hexadiene, 1,4-pentadiene or liquid polybutadiene.

3. A process according to claim 1 wherein said trialkyl aluminum is triethyl aluminum or tri-isobutyl aluminum.

4. A process according to claim 1 wherein said trialkyl aluminum compound is triethyl aluminum, said monoolefin is hexene-1, and said diluent is benzene.

5. A process according to claim 1 wherein said trialkyl aluminum is triethyl aluminum, said monoolefin is ethylene and said diluent is cyclohexane.

6. A process according to claim 1 wherein said trialkyl aluminum compound is triethyl aluminum, said multiolefin is liquid polybutadiene and said diluent is benzene.

7. A process according to claim 1 wherein said trialkyl aluminum is triethyl aluminum, said multiolefin is butadiene and said diluent is cyclohexane.

8. A process according to claim 1 wherein said diluent is benzene or cyclohexane, and said contacting is conducted at refluxing conditions of said diluent.

9. A process for preparing polystyrene having a melting point above 220° C. which comprises polymerizing styrene by contacting said styrene in a hydrocarbon diluent with a catalyst at a temperature of from 75 to 100° C., said catalyst formed by admixing (a) a trialkyl aluminum compound with (b) titanium tetrachloride in a mole ratio of trialkyl aluminum to titanium tetrachloride within the range of 2 to 5, and said diluent being present in an amount of from 0.5 to 20 volumes per volume of said styrene.

10. A process according to claim 9 wherein said diluent is benzene or cyclohexane.

11. A process according to claim 9 wherein said trialkyl aluminum compound is triethyl aluminum or tri-isobutyl aluminum.

12. A process according to claim 9 wherein said contacting is conducted at a refluxing conditions of said diluent.

References Cited

UNITED STATES PATENTS

| | | | |
|---|---|---|---|
| 2,839,518 | 6/1958 | Breber | 260—94.9 |
| 2,862,917 | 12/1958 | Anderson et al. | 260—94.9 |
| 2,838,477 | 6/1958 | Roelen et al. | 260—88.1 |
| 2,832,759 | 4/1958 | Nowlin et al. | 260—88.1 |
| 2,200,429 | 5/1940 | Perrin et al. | 260—88.1 |
| 2,388,225 | 10/1945 | Brooks | 260—88.1 |
| 2,563,631 | 8/1951 | Young et al. | 260—88.1 |
| 2,721,189 | 10/1955 | Anderson et al. | 260—93.7 |

FOREIGN PATENTS

| | | |
|---|---|---|
| 533,362 | 5/1955 | Belgium. |
| 538,782 | 12/1955 | Belgium. |

OTHER REFERENCES

Natta et al.: Chem. Abstracts, p. 4563, vol. 31, No. 13, July 1937.

Natta et al.: Die Makromolekulare Chemie, Band 16, Heft 1, pp. 77–80, May 25, 1955.

Natta: Die Makromolekulare Chemie, Band 16, Heft 3, pp. 213–237, Sept. 8, 1955.

J. Polymer Sci., vol. XVI (1955), article beginning at p. 143.

JOSEPH L. SCHOFER, *Primary Examiner.*

J. C. HAIGHT, *Assistant Examiner.*

U.S. Cl. X.R.

260—83.7, 88.2, 93.5